US006412741B1

(12) United States Patent
Olivero

(10) Patent No.: US 6,412,741 B1
(45) Date of Patent: Jul. 2, 2002

(54) BEVERAGE HOLDING DEVICE WITH RAILING ATTACHMENT

(76) Inventor: Dennis Olivero, 82 Lawrence St., Fords, NJ (US) 08863

( * ) Notice: Subject to any disclaimer, the term of this patent is extended or adjusted under 35 U.S.C. 154(b) by 0 days.

(21) Appl. No.: 09/780,332

(22) Filed: Feb. 9, 2001

(51) Int. Cl.⁷ ................................................ A47K 1/09
(52) U.S. Cl. .................................... 248/313; 248/311.2
(58) Field of Search ............................ 248/313, 311.2, 248/229.23, 227.4, 228.6, 230.4, 231.51, 510, 316.1; 224/926; 403/385; 292/246, 247; 285/409

(56) References Cited

U.S. PATENT DOCUMENTS

| | | | | |
|---|---|---|---|---|
| 3,516,695 A | * | 6/1970 | Lowe ........................... | 403/385 |
| 4,011,951 A | * | 3/1977 | Boyer ........................ | 119/51.5 |
| 4,270,724 A | * | 6/1981 | McMullen ................ | 248/230.4 |
| 4,660,870 A | * | 4/1987 | Donley ........................ | 24/273 |
| 4,878,642 A | | 11/1989 | Kirby, Jr. ................. | 248/311.2 |
| 5,190,257 A | * | 3/1993 | Gradei et al. .......... | 248/231.71 |
| 5,295,650 A | * | 3/1994 | Brandt ........................ | 108/26 |
| 5,385,325 A | * | 1/1995 | Rigsby ....................... | 224/552 |
| 5,522,527 A | * | 6/1996 | Tsai ........................... | 224/414 |
| 5,597,148 A | | 1/1997 | Gospodarich ............ | 248/311.2 |
| 5,634,621 A | * | 6/1997 | Jankovic ..................... | 224/926 |
| 5,678,741 A | * | 10/1997 | Schieber ...................... | 108/44 |
| 5,722,666 A | * | 3/1998 | Sisk ........................... | 277/615 |
| 6,227,510 B1 | * | 5/2001 | McMullen, Sr. ......... | 248/311.2 |
| D449,814 S | * | 10/2001 | Guertin ...................... | D12/411 |

* cited by examiner

Primary Examiner—Korie Chan
Assistant Examiner—Ingrid Weinhold
(74) Attorney, Agent, or Firm—Goldstein & Lavas, P.C.

(57) ABSTRACT

A beverage holding device with railing attachment including a pair of circular rings dimensioned for receiving a beverage therein. Exterior arcs of the circular rings each have a vertical support extending downwardly therefrom having a horizontal support extending therebetween. A C-shaped clamping portion is adapted for coupling with a tubular rail. The clamping portion is comprised of an upper arcuate member and a lower arcuate member. The arcuate members each have an interior edge and an exterior edge. The interior edges are pivotally coupled by a hinge bar. The hinge bar has a cross plate secured to an outer surface thereof. The cross plate is secured to the pair of circular rings. A locking assembly is coupled with the C-shaped clamping portion for selectively locking the clamping portion to the tubular rail.

2 Claims, 1 Drawing Sheet

BEVERAGE HOLDING DEVICE WITH RAILING ATTACHMENT

BACKGROUND OF THE INVENTION

The present invention relates to a beverage holding device with railing attachment and more particularly pertains to attaching to a tubular rail for holding at least one beverage.

The use of beverage holding devices is known in the prior art. More specifically, beverage holding devices heretofore devised and utilized for supporting beverages are known to consist basically of familiar, expected and obvious structural configurations, notwithstanding the myriad of designs encompassed by the crowded prior art that have been developed for the fulfillment of countless objectives and requirements.

By way of example, U.S. Pat. No. 5,190,257 to Gradei discloses a beverage container holder with a C-clamp bracket having an adjustable clamping screw. U.S. Pat. No. 4,878,642 to Kirby, Jr. and U.S. Pat. No. 5,597,148 to Gospodarich disclose additional attachable beverage supporting devices.

While these devices fulfill their respective, particular objective and requirements, the aforementioned patents do not describe a beverage holding device with railing attachment for attaching to a tubular rail for holding at least one beverage.

In this respect, the beverage holding device with railing attachment according to the present invention substantially departs from the conventional concepts and designs of the prior art, and in doing so provides an apparatus primarily developed for the purpose of attaching to a tubular rail for holding at least one beverage.

Therefore, it can be appreciated that there exists a continuing need for a new and improved beverage holding device with railing attachment that can be used for attaching to a tubular rail for holding at least one beverage. In this regard, the present invention substantially fulfills this need.

SUMMARY OF THE INVENTION

In the view of the foregoing disadvantages inherent in the known types of beverage holding devices now present in the prior art, the present invention provides an improved beverage holding device with railing attachment. As such, the general purpose of the present invention, which will be described subsequently in greater detail, is to provide a new and improved beverage holding device with railing attachment that has all the advantages of the prior art and none of the disadvantages.

To attain this, the present invention essentially comprises a pair of circular rings dimensioned for receiving a beverage therein. The pair of circular rings are positioned in a side by side relationship and attached along corresponding interior arcs thereof. Exterior arcs of the circular rings each have a vertical support extending downwardly therefrom. The vertical supports each have a free lower end. The free lower ends have a horizontal support extending therebetween. The horizontal support is diametrically below the pair of circular rings to provide a bottom for a beverage positioned within the circular rings. A C-shaped clamping portion is adapted for coupling with a tubular rail. The clamping portion comprises an upper arcuate member and a lower arcuate member. The arcuate members each have an interior edge and an exterior edge. The interior edges are pivotally coupled by a hinge bar. The hinge bar has a cross plate secured to an outer surface thereof. The clamping portion includes a L-shaped bracket secured to the cross plate. The L-shaped bracket includes a vertical segment extending downwardly from the cross plate. The vertical segment has a horizontal segment extending outwardly from a free end thereof. The horizontal segment has a free end secured to the horizontal support of the pair of circular rings. A locking assembly is coupled with the C-shaped clamping portion for selectively locking the clamping portion to the tubular rail. The locking assembly includes a pivot handle coupled with the exterior edge of the lower arcuate member of the clamping portion. The pivot handle has an inverted U-shaped bracket adjustably coupled thereto. The inverted U-shaped bracket includes a horizontal upper bar and threaded free ends adjustably coupled with nuts pivotally secured to opposed sides of the pivot handle. The locking assembly includes a pair of arms extending outwardly from the exterior edge of the upper arcuate member of the clamping portion. The pair of arms include recesses therein for receiving the horizontal upper bar of the inverted U-shaped bracket in a locked orientation whereby the pivot handle can be lowered.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved beverage holding device with railing attachment that has all the advantages of the prior art beverage holding devices and none of the disadvantages.

It is another object of the present invention to provide a new and improved beverage holding device with railing attachment that may be easily and efficiently manufactured and marketed.

It is a further object of the present invention to provide a new and improved beverage holding device with railing attachment that is of durable and reliable construction.

An even further object of the present invention is to provide a new and improved beverage holding device with railing attachment that is susceptible of a low cost of manufacture with regard to both materials and labor, and which accordingly is then susceptible of low prices of sale to the consuming public, thereby making such a beverage holding device with railing attachment economically available to the buying public.

Even still another object of the present invention is to provide a new and improved beverage holding device with railing attachment for attaching to a tubular rail for holding at least one beverage.

Lastly, it is an object of the present invention to provide a new and improved beverage holding device with railing attachment including a pair of circular rings dimensioned for receiving a beverage therein. The pair of circular rings are positioned in a side by side relationship and attached along corresponding interior arcs thereof. Exterior arcs of the circular rings each have a vertical support extending downwardly therefrom. The vertical supports each have a free lower end. The free lower ends have a horizontal support extending therebetween The horizontal support is diametrically below the pair of circular rings to provide a bottom for a beverage positioned within the circular rings. A C-shaped clamping portion is adapted for coupling with a tubular rail. The clamping portion comprises an upper arcuate member and a lower arcuate member. The arcuate members each have an interior edge and an exterior edge. The interior edges are pivotally coupled by a hinge bar. The hinge bar has a cross plate secured to an outer surface thereof. The cross plate is secured to the pair of circular rings. A locking assembly is coupled with the C-shaped clamping portion for selectively locking the clamping portion to the tubular rail.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figures 1, 2:
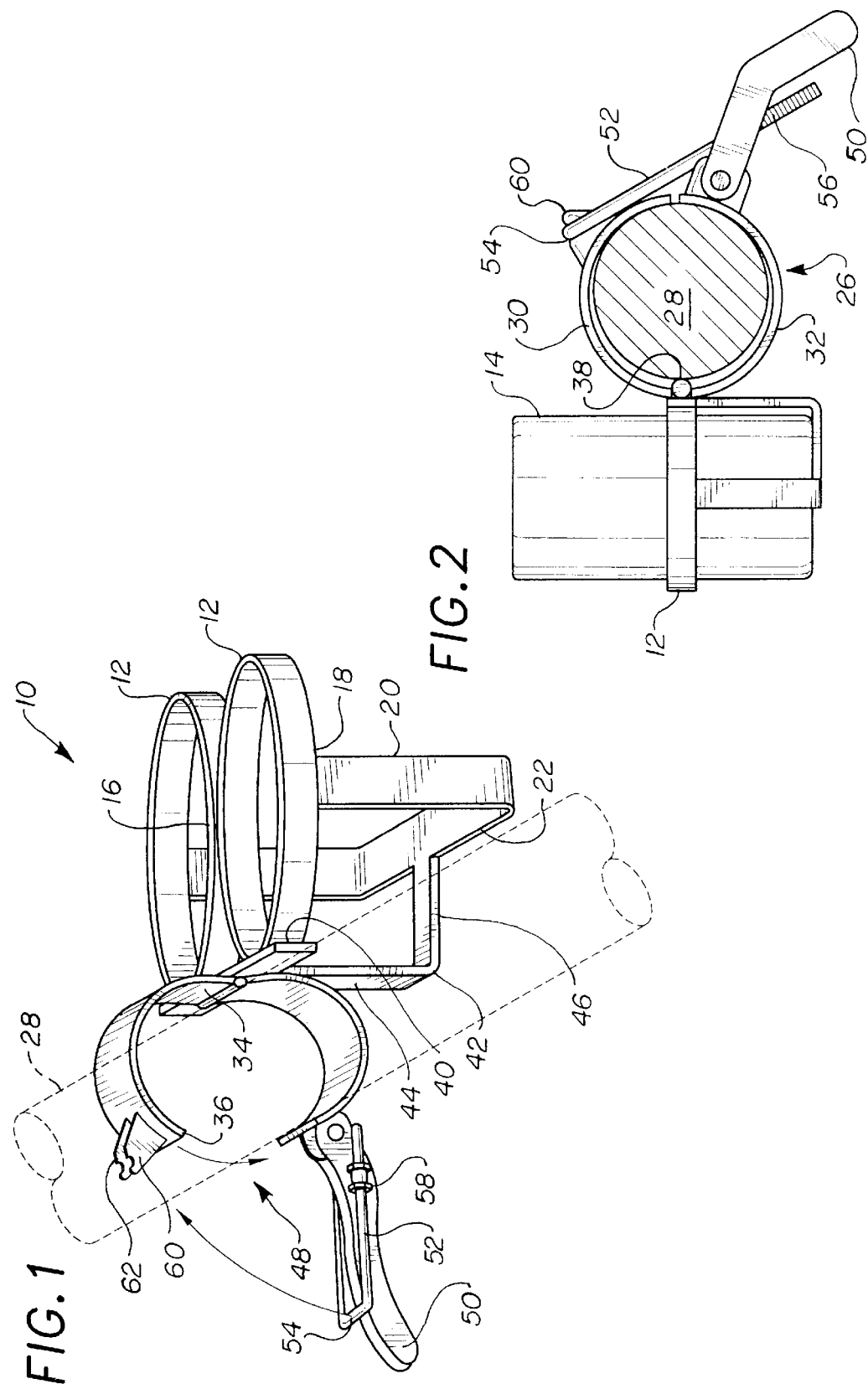
FIG. 1 is a perspective view of the preferred embodiment of the beverage holding device with railing attachment constructed in accordance with the principles of the present invention.
FIG. 2 is a side view of the present invention illustrated in use.

With reference now to the drawings, and in particular, to figures one through two thereof, the preferred embodiment of the new and improved beverage holding device with railing attachment embodying the principles and concepts of the present invention and generally designated by the reference number 10 will be described.

Specifically, it will be noted in the various figures that the device relates to a beverage holding device with railing attachment for attaching to a tubular rail for holding at least one beverage. In its broadest context, the device consists of a pair of circular rings, a C-shaped clamping portion, and a locking assembly. Such components are individually configured and correlated with respect to each other so as to attain the desired objective.

The pair of circular rings 12 are dimensioned for receiving a beverage 14 therein. The pair of circular rings 12 are positioned in a side by side relationship and attached along corresponding interior arcs 16 thereof. Exterior arcs 18 of the circular rings 12 each have a vertical support 20 extending downwardly therefrom. The vertical supports 20 each have a free lower end. The free lower ends have a horizontal support 22 extending therebetween. The horizontal support 22 is diametrically below the pair of circular rings 12 to provide a bottom for a beverage 14 positioned within the circular rings 12.

The C-shaped clamping portion 26 is adapted for coupling with a tubular rail 28. The clamping portion 26 comprises an upper arcuate member 30 and a lower arcuate member 32. The arcuate members 30, 32 each have an interior edge 34 and an exterior edge 36. The interior edges 34 are pivotally coupled by a hinge bar 38. The hinge bar 38 has a cross plate 40 secured to an outer surface thereof. The clamping portion 26 includes a L-shaped bracket 42 secured to the cross plate 40. The L-shaped bracket 42 includes a vertical segment 44 extending downwardly from the cross plate 40. The vertical segment 44 has a horizontal segment 46 extending outwardly from a free end thereof. The horizontal segment 46 has a free end secured to the horizontal support 22 of the pair of circular rings 12.

The locking assembly 48 is coupled with the C-shaped clamping portion 26 for selectively locking the clamping portion 26 to the tubular rail 28. The locking assembly 48 includes a pivot handle 50 coupled with the exterior edge 36 of the lower arcuate member 32 of the clamping portion 26. The pivot handle 50 has an inverted U-shaped bracket 52 adjustably coupled thereto. The inverted U-shaped bracket 52 includes a horizontal upper bar 54 and threaded free ends 56 adjustably coupled with nuts 58 pivotally secured to opposed sides of the pivot handle 50. The length of the inverted U-shaped bracket 52 can be adjusted via the nut's 58 to accommodate a variety of sizes of tubular rails 28. The locking assembly 48 includes a pair of arms 60 extending outwardly from the exterior edge 36 of the upper arcuate member 30 of the clamping portion 26. The pair of arms 60 include recesses 62 therein for receiving the horizontal upper bar 54 of the inverted U-shaped bracket 52 in a locked orientation whereby the pivot handle 50 can be lowered. Note FIG. 2. When in the locked orientation, the circular rings 12 will be tightly secured to the tubular rail 28 whereby the beverage 14 can be held in place without risk of falling or spilling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A beverage holding device with railing attachment for attaching to a tubular rail for holding at least one beverage comprising, in combination:

a pair of circular rings dimensioned for receiving a beverage therein, the pair of circular rings being positioned in a side by side relationship and attached along corresponding interior arcs thereof, exterior arcs of the circular rings each having a vertical support extending downwardly therefrom, the vertical supports each having a free lower end, the free lower ends having a horizontal support extending therebetween, the horizontal support being diametrically below the pair of circular rings to provide a bottom for a beverage positioned within the circular rings;

a C-shaped clamping portion adapted for coupling with a tubular rail, the clamping portion being comprised of an upper arcuate member and a lower arcuate member, the arcuate members each having an interior edge and an exterior edge, the interior edges being pivotally coupled by a hinge bar, the hinge bar having a cross plate secured to an outer surface thereof, the clamping portion including a L-shaped bracket secured to the cross plate, the L-shaped bracket including a vertical segment extending downwardly from the cross plate, the vertical segment having a horizontal segment extending outwardly from a free end thereof, the horizontal segment having a free end secured to the horizontal support of the pair of circular rings; and a locking assembly coupled with the C-shaped clamping portion for selectively locking the clamping portion to the tubular rail, the locking assembly including a pivot handle coupled with the exterior edge of the lower arcuate member of the clamping portion, the pivot handle having an inverted U-shaped bracket adjustably coupled thereto, the inverted U-shaped bracket including a horizontal upper bar and threaded free ends adjustable coupled with nuts pivotally secured to opposed sides of the pivot handle, the locking assembly including a pair of arms extending outwardly from the exterior edge of the upper arcuate member of the clamping portion, the pair of arms including recesses therein for receiving the horizontal upper bar of the inverted U-shaped bracket in a locked orientation whereby the pivot handle can be lowered.

2. A beverage holding device with railing attachment for attaching to a tubular rail for holding at least one beverage comprising, in combination:

a pair of circular rings dimensioned for receiving a beverage therein, the pair of circular rings being positioned in a side by side relationship and attached along corresponding interior arcs thereof, exterior arcs of the circular rings each having a vertical support extending downwardly therefrom, the vertical supports each having a free lower end, the free lower ends having a horizontal support extending therebetween, the horizontal support being diametrically below the pair of circular rings to provide a bottom for a beverage positioned within the circular rings;

a C-shaped clamping portion adapted for coupling with a tubular rail, the clamping portion being comprised of an upper arcuate member and a lower arcuate member, the arcuate members each having an interior edge and an exterior edge, the interior edges being pivotally coupled by a hinge bar, the hinge bar having a cross plate secured to an outer surface thereof for being engaged to the pair of circular rings, the clamping portion further comprising a L-shaped bracket secured to the cross plate, the L-shaped bracket including a vertical segment extending downwardly from the cross plate, the vertical segment having a horizontal-segment extending outwardly from a free end thereof, the horizontal segment having a free end secured to the horizontal support of the pair of circular rings; and a locking assembly coupled with the C-shaped clamping portion for selectively locking the clamping portion to the tubular rail.

* * * * *